United States Patent
Jaquez et al.

(10) Patent No.: US 9,953,314 B2
(45) Date of Patent: Apr. 24, 2018

(54) SYSTEM, METHOD, AND COMPUTER-READABLE STORAGE MEDIUM FOR PAYMENT OF ONLINE PURCHASES VIA A PORTABLE COMPUTING DEVICE

(71) Applicant: SHOPSAVVY INC., Dallas, TX (US)

(72) Inventors: Abiel Jaquez, Plano, TX (US);
Alexander Muse, Dallas, TX (US);
John Boyd, Denton, TX (US);
Matthew Weathers, Palo Alto, CA (US); Scott Gordon Roberts, Dallas, TX (US); Kevin Henry Clark, Denton, TX (US); Rylan Barnes, Plano, TX (US)

(73) Assignee: SHOPSAVVY., INC., New York, NY (US)

( * ) Notice: Subject to any disclaimer, the term of this patent is extended or adjusted under 35 U.S.C. 154(b) by 0 days.

(21) Appl. No.: 13/649,704

(22) Filed: Oct. 11, 2012

(65) Prior Publication Data

US 2013/0297390 A1    Nov. 7, 2013

Related U.S. Application Data

(60) Provisional application No. 61/670,827, filed on Jul. 12, 2012, provisional application No. 61/640,906, filed on May 1, 2012.

(51) Int. Cl.
*G06Q 40/00*    (2012.01)
*G06Q 20/36*    (2012.01)
(Continued)

(52) U.S. Cl.
CPC .............. *G06Q 20/36* (2013.01); *G06Q 20/12* (2013.01); *G06F 3/0482* (2013.01);
(Continued)

(58) Field of Classification Search
CPC ........ G06Q 30/06; G06Q 40/00; G06Q 30/00; G06Q 20/36; G06Q 20/12; G06Q 30/02;
(Continued)

(56) References Cited

U.S. PATENT DOCUMENTS 6,463,304 B2 * 10/2002 Smethers .............. G06F 1/1626
455/566
7,302,429 B1 * 11/2007 Wanker ................. G06Q 30/02
(Continued)

OTHER PUBLICATIONS

Vital(R) chooses VeriSign as preferred internet payment service for its client base. (Apr. 3, 2002). PR Newswire Retrieved from https://dialog.proquest.com/professional/docview/678677984?accountid=142257 (Year: 2002).*
(Continued)

*Primary Examiner* — Kito R Robinson
(74) *Attorney, Agent, or Firm* — Stroock & Stroock & Lavan, LLP

(57) ABSTRACT

A system, method, and computer-readable storage medium for enabling an individual to use a purchase-proxy mechanism to conduct a financial transaction from a computing device with an online merchant, whereby the individual is enabled to use stored personal data, such as financial account information and fulfillment information, without having to store the personal data with the online merchant. The system, method, and computer-readable storage medium furthermore enable an individual to change a payment and/or fulfillment option at the time of purchase with minimal inconvenience.

24 Claims, 7 Drawing Sheets

(51) Int. Cl.
*G06Q 20/12* (2012.01)
*G06F 17/30* (2006.01)
*G06Q 30/06* (2012.01)
*G06Q 30/02* (2012.01)
*G06F 3/0482* (2013.01)
*G06F 3/0484* (2013.01)

(52) U.S. Cl.
CPC .... *G06F 3/04842* (2013.01); *G06F 17/30893* (2013.01); *G06Q 30/02* (2013.01); *G06Q 30/0201* (2013.01); *G06Q 30/0601* (2013.01); *G06Q 30/0613* (2013.01); *G06Q 30/0641* (2013.01)

(58) Field of Classification Search
CPC ........... G06Q 30/0641; G06Q 30/0201; G06Q 30/0601; G06F 12/14; G06F 17/30893; G06F 3/0482; G06F 3/04842
USPC ......... 705/44, 26.1, 41, 30, 27.1, 37, 14, 39, 705/26.8, 0.37; 715/733; 713/193
See application file for complete search history.

(56) References Cited

U.S. PATENT DOCUMENTS

| | | | | |
|---|---|---|---|---|
| 7,720,712 | B1* | 5/2010 | Allocca et al. | ............... 705/27.1 |
| 8,756,117 | B1* | 6/2014 | Ballaro | ................ G06Q 10/087 705/26.1 |
| 2002/0062218 | A1* | 5/2002 | Pianin | .................... G06Q 30/02 705/26.1 |
| 2002/0077156 | A1* | 6/2002 | Smethers | .............. G06F 1/1626 455/566 |
| 2002/0077930 | A1* | 6/2002 | Trubey | ................... G06Q 30/02 705/27.2 |
| 2003/0208396 | A1* | 11/2003 | Miller et al. | ..................... 705/14 |
| 2004/0068443 | A1* | 4/2004 | Hopson | ................. G06Q 10/02 705/5 |
| 2004/0199430 | A1* | 10/2004 | Hsieh | ..................... G06Q 30/02 705/26.62 |
| 2005/0192008 | A1* | 9/2005 | Desai | .................... G06F 21/335 455/435.2 |
| 2005/0235282 | A1* | 10/2005 | Anderson | ................. G06F 8/65 717/178 |
| 2006/0047598 | A1* | 3/2006 | Hansen | .................. G06Q 40/04 705/37 |
| 2006/0107217 | A1* | 5/2006 | Lu et al. | ....................... 715/733 |
| 2007/0156527 | A1* | 7/2007 | Rubinstein | ............. G06Q 30/02 705/14.41 |
| 2007/0299743 | A1* | 12/2007 | Staib | .................... G06Q 10/107 705/7.33 |
| 2008/0189190 | A1* | 8/2008 | Ferber | .................... G06O 30/06 705/26.41 |
| 2009/0177894 | A1* | 7/2009 | Orsini | ................. G06F 21/6209 713/193 |
| 2009/0228376 | A1* | 9/2009 | Rollins et al. | ................... 705/30 |
| 2010/0037298 | A1* | 2/2010 | Lottin | ................... H04L 29/12594 726/4 |
| 2012/0113809 | A1* | 5/2012 | Cortes Gomez | .... H04L 12/5691 370/235 |
| 2012/0158584 | A1* | 6/2012 | Behren et al. | .................. 705/41 |
| 2012/0224102 | A1* | 9/2012 | Kang | ............... H04N 21/42201 348/563 |
| 2014/0337774 | A1* | 11/2014 | Baarz | .................... G06F 3/0486 715/769 |

OTHER PUBLICATIONS

Morris, H. M. (1997). Selecting an operator interface for a PLC. Control Engineering, 44(6), 63-68. Retrieved from https://dialog.proquest.com/professional/docview/200439037?accountid=142257 (Year: 1997).*

Empower solutions increases public school procurement efficiency. (May 7, 2003). PR Newswire Retrieved from https://dialog.proquest.com/professional/docview/668519564?accountid=142257 (Year: 2003).*

* cited by examiner

SYSTEM, METHOD, AND COMPUTER-READABLE STORAGE MEDIUM FOR PAYMENT OF ONLINE PURCHASES VIA A PORTABLE COMPUTING DEVICE

CROSS-REFERENCE

This application claims priority to U.S. Provisional Patent Application No. 61/640,906, entitled: "System, Method, and Computer-Readable Storage Medium for Payment of Online Purchases via a Portable Computing Device," filed May 1, 2012, and U.S. Provisional Patent Application No. 61/670,827, entitled: "System, Method, and Computer-Readable Storage Medium for Identifying a Product," filed Jul. 12, 2012, the contents of both of which are incorporated by reference in their entireties.

FIELD

Example embodiments of the present invention pertain to enabling electronic payments from computing devices for the purchase of goods or services.

BACKGROUND

Portable computing devices such as smartphones and tablet computers have become a prevalent fixture of modern life. Smartphones, such as the iPhone, Android phones, and Blackberries, have been adopted by a broad audience of users due to the devices' usefulness and entertainment value. Similarly, tablet computers, such as the iPad, the Kindle Fire, and the Nook Tablet, have become popular devices. As with smartphones, a wide range of users are attracted to tablet computers' for their ease of use and varied functionality.

The Internet is a ubiquitous feature of modern life. In addition to communication and entertainment purposes, users employ the Internet to purchase products from online merchants. Web sites such as Amazon.com, Amazon Marketplace, Buy.com, Overstock.com, online versions of bricks-and-mortar retailers (e.g., BestBuy.com, Walmart.com, Target.com, etc.) and others offer users an accessible avenue for purchasing goods and services from nearly any type of computer, including portable computing devices.

Although it is possible to conduct a purchase with an online merchant via portable computing devices, it is often a cumbersome and limited procedure when compared to conducting a purchase by way of a standard computing device, such as a desktop or a laptop. Most portable electronic devices are equipped with touchscreen interfaces and, while a touchscreen may function well for a wide range of purposes, it can be difficult to use for online purchases. For example, a lack of tactile feedback can make typing on a touchscreen keyboard difficult. This can be particularly frustrating when entering complicated information, such as financial information, a shipping address, etc. when making an online purchase.

To account for this, many online merchants allow users to store personal data (e.g., financial account information, shipping addresses, etc.) in a user account, often called an "electronic wallet." Because the online merchant, and in turn the electronic wallet, is accessible from any Internet-capable device, a user may enter account data via a one device (e.g., a desktop computer) and later access it via another one (e.g., a smartphone). As most online merchants are not affiliated with one another, a user has to store his personal data with each merchant. Having to enter personal data each time a new electronic wallet is needed can be frustrating and off-putting.

Applications designed specifically for portable computing devices, called "apps," offer users a more convenient way to conduct online purchases via such devices, but apps often sacrifice functionality in order to offer convenience. Users may be required to establish one payment method and one fulfillment preference (e.g., a default shipping address and/or shipping method). While this makes conducting purchases easier, it does not provide the flexibility often desired. For example, a user may wish to have rush delivery, but may not readily select that option via an app. Even if the app allows the user to select other personal data for a transaction, it may require the user perform several steps to do so, thereby eliminating much of the app's convenience. In order to use apps that are specific to a particular merchant (e.g., Amazon, Barnes and Noble, etc.), users must store their personal data with each merchant. Apps that enable a user to search products offered by multiple merchants do not relieve this problem. For example, although Google Shopper enables a user to search multiple merchants, once one is selected, the user is taken to the online merchant's mobile Web page, where the user either has to have previously stored personal data or must enter it to complete the purchase.

What is lacking is a mechanism that enables an individual to use a portable computing device to purchase goods or services offered by multiple online merchants in a convenient fashion. What is also needed is a convenient mechanism that enables an individual to employ stored personal data to conduct purchases with multiple online merchants without having to store his personal data with each online merchant. Furthermore, what is needed is a mechanism that enables an individual to change payment and/or fulfillment options readily when conducting a purchase with an online merchant via a portable computing device.

SUMMARY

Example embodiments of the present invention pertain to a system, method, and computer-readable storage medium for enabling an individual to use a purchase-proxy mechanism to conduct a financial transaction from a computing device with an online merchant, whereby the individual is enabled to use stored personal data, such as financial account information and fulfillment information, without having to store the personal data with the online merchant. Furthermore, the example embodiments of the present invention pertain to a mechanism that enables an individual to change a payment and/or fulfillment option at the time of purchase with minimal inconvenience.

BRIEF DESCRIPTION OF DRAWINGS

In order to describe the manner in which the above-recited and other advantages and features of example embodiments of the present invention may be obtained, a more particular description of example embodiments of the present invention briefly described above will be rendered by reference to specific example embodiments thereof that are illustrated in the appended drawings. Understanding that these drawings depict only typical example embodiments of the present invention and are not therefore to be considered limiting of its scope, example embodiments of the present invention will be described and explained with additional specificity and detail through the use of the accompanying drawings in which.

DESCRIPTION

Various example embodiments of the present invention are discussed in detail below with reference to the accompanying drawings, in which example embodiments of the present invention are shown. While specific implementations are discussed, this is done for illustration purposes only. A person of ordinary skill in the relevant art will recognize that other components and configurations may be used without departing from the spirit and scope of the present invention. Like numbers refer to like elements throughout.

Example embodiments of the present invention are described herein mainly in terms of an individual accessing the Internet, such as via a portable computing device, such as a smartphone, a personal digital assistant (PDA), a tablet computer, etc., or a standard computing device, such as a desktop computer, a laptop computer, etc. This is not to be construed as limiting as the present invention may be applicable to any electronic network accessible to a user via a network-appropriate device.

Merchant Network

Figure 1:
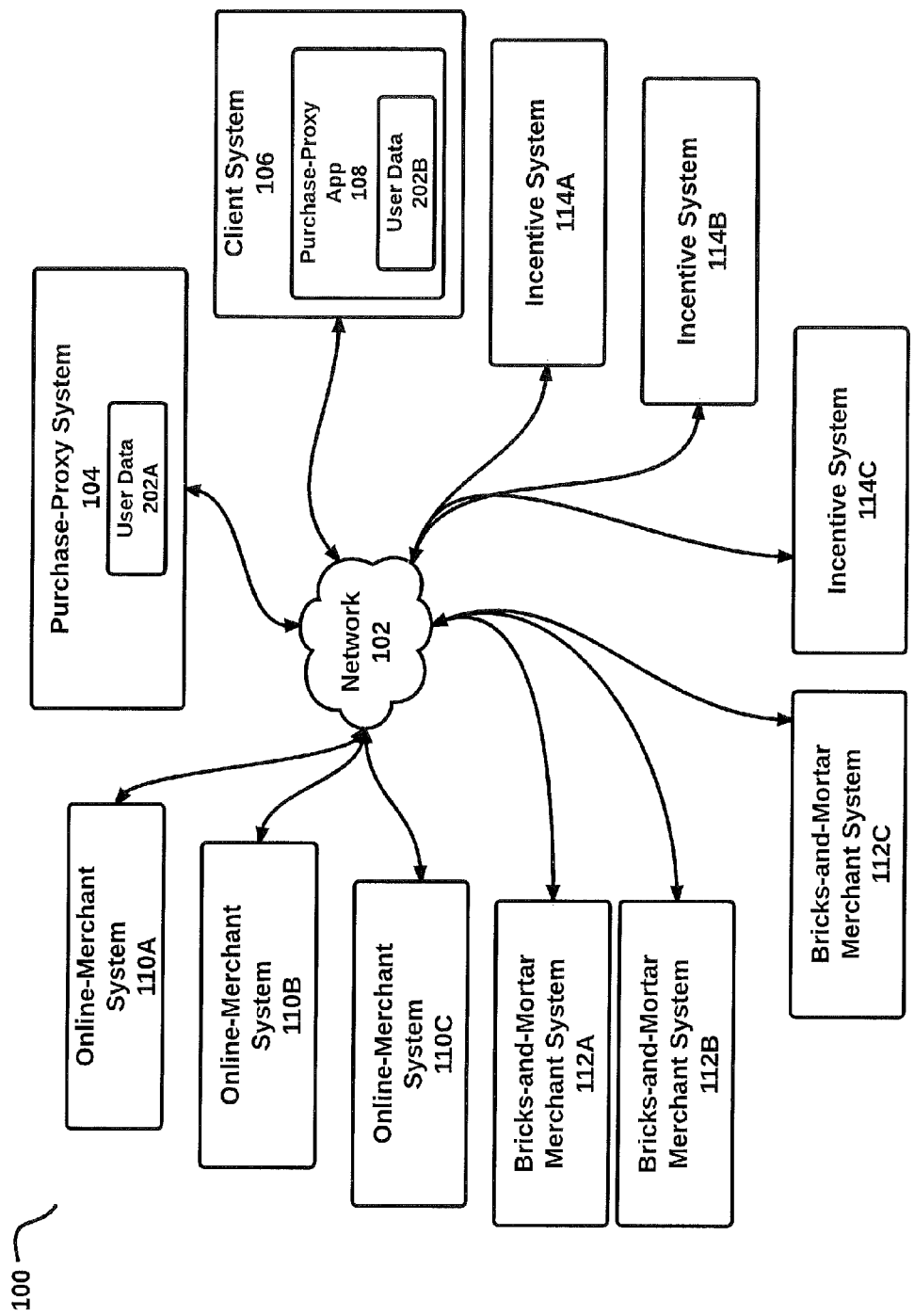
FIG. 1 depicts a component architecture of a merchant network including a purchase-proxy system according to an example embodiment.

FIG. 1 depicts a component architecture of merchant network 100 including purchase-proxy system 104 (PPS) according to an example embodiment. The components of merchant network 100 may interact with one another via one or more networks 102, which may include any applicable electronic network, such as the Internet or a mobile network. Components are herein referenced as "systems," "mechanisms," and "modules." This is not to be construed as limiting, and it is to be understood that each component may include the necessary hardware, which may operate alone or under direction of appropriate firmware and/or software to enable the processing, storing, communicating and/or receiving of data. For example, a component may include one or more computer processors, computer servers, data stores, electronic components, storage mediums, memory, etc. Although a limited number of each component is depicted, this is for illustrative purposes only and is not to be construed as limiting, as merchant network 100 may include any number of (i.e., one or more) instances of each component. For example, merchant network 100 may include any number of PPSes 104, client systems 106, merchant systems, incentive systems, etc. Furthermore, although each component is depicted and described herein as separate, this is not to be construed as limiting, and components may be combined per implementation.

PPS 104 may be a system that enables the management, storage, and control of data provided by individuals and online merchants to enable the individuals to conduct purchases with one or more online-merchant systems. As described in detail below, PPS 104 may store user data and merchant data, and may include one or more mechanisms that enable a user to employ a portable computing device to conduct a purchase with an online-merchant system. In one example embodiment, PPS 104 may also enable a user to conduct a purchase with an online-merchant system via a desktop computer, a laptop computer, or another standard personal computing device.

Merchant network 100 may include one or more online-merchant systems. For example, as depicted for illustrative purposes in FIG. 1, merchant network 100 may include online-merchant system 110A, online-merchant system 110B, and online-merchant system 110C. An online merchant may be a retailer, reseller, vendor, manufacturer, individual, etc. that offers goods or services (herein individually or collectively referred to as "products") to consumers via network 102 (e.g., the Internet), and an online-merchant system may be the system that enables the online merchant to do so. For example, an online-merchant system may be a system maintained by Amazon, Overstock, Barnes & Nobles, Buy.com, Best Buy, Wal-Mart, Target, eBay, etc. An online-merchant system may include a Web site that an individual may access via a Web browser or via an app to search for and purchase a desired product. The individual may purchase the product by providing payment information and, if necessary, fulfillment information (e.g., a shipping address, a shipping method, in-store pickup, etc.) to the online-merchant system. The online-merchant system may store payment and fulfillment information for users, thereby alleviating the need for users to provide such information each time they conduct a purchase with the online merchant. Once a product is purchased, the financial account indicated by the provided payment information is charged, and the user is provided with the product. If the product is a tangible good, it may be shipped to the individual per provided shipping information. If the product is a digital good or service, the user may be granted access to it. For example, the user may be given digital products (e.g., music files, electronic books, computer games, etc.). In other examples, the user may be given access to an online service, or may receive a physical service at a location (e.g., maid service, house repair, etc.).

Merchant network 100 may include one or more bricks-and-mortar merchant systems (e.g., bricks-and-mortar systems 112A, 112B, and 112C). While a bricks-and-mortar merchant may have an online presence, it may not offer products for sale via network 102 (e.g., the Internet). PPS 104 may interact with a bricks-and-mortar merchant system in order to access and provide product data to users in conjunction with product data from online-merchant systems. In one example embodiment, PPS 104 may enable a user to conduct a purchase with a bricks-and-mortar merchant. For example, a user may employ PPS 104 to pre-pay for an in-store purchase with a bricks-and-mortar merchant. In one scenario, if a bricks-and-mortar merchant store is properly equipped, a user may employ his PPS user wallet to conduct an in-store transaction.

Merchant network 100 may include one or more incentive systems (e.g., incentive systems 114A, 114B, and 114C). An incentive system may be any system configured to provide users with incentives to purchase a product. In one example embodiment, an incentive system may include a Web site. For example, an incentive system may be managed by Groupon, LivingSocial, RetailMeNot, etc. An incentive may be a discount, a promotion, a reward, etc., and an incentive may be enabled by a code (e.g., a coupon code), an action (e.g., buy one to get one free), a membership account (e.g., a membership account number), etc. Depending upon the particular incentive system, a user may be required to have an account (e.g., an electronic wallet) with the incentive system in order to make use of its incentives.

A user may interact with one or more components of merchant network 100 via client system 106. Client system 106 may include hardware, which may operate alone or under direction of appropriate software and/or firmware configured to enable the viewing and the inputting of information by the user. For example, client system 106 may be portable computing device, such as a smartphone, a tablet computer, a mobile phone, a PDA, a portable media player (e.g., an iPod), a multi-purpose mobile device (e.g., an iPod Touch), etc. In other example embodiments, client system 106 may be a desktop computer, a laptop computer, or another standard personal computing device. Client system 106 may include purchase-proxy app 108, which may be a mechanism by which the user interacts with PPS 104 to search for products offered by online merchants and to conduct purchases for such products. In one example embodiment, purchase-proxy app 108 is an app loaded onto a portable computing device (client system 106). For example, purchase-proxy app 108 may be an app installed on an iPhone, an Android phone, a Blackberry, an iPad, an Android-powered tablet (e.g. a Kindle Fire, a Nook Tablet, a Samsung Galaxy, a Motorola Xoom, etc.), etc. In another example embodiment, purchase-proxy app 108 may be another type of application, such as a software application, a cloud service application, etc.

Purchase-Proxy System (PPS)

Figure 2:
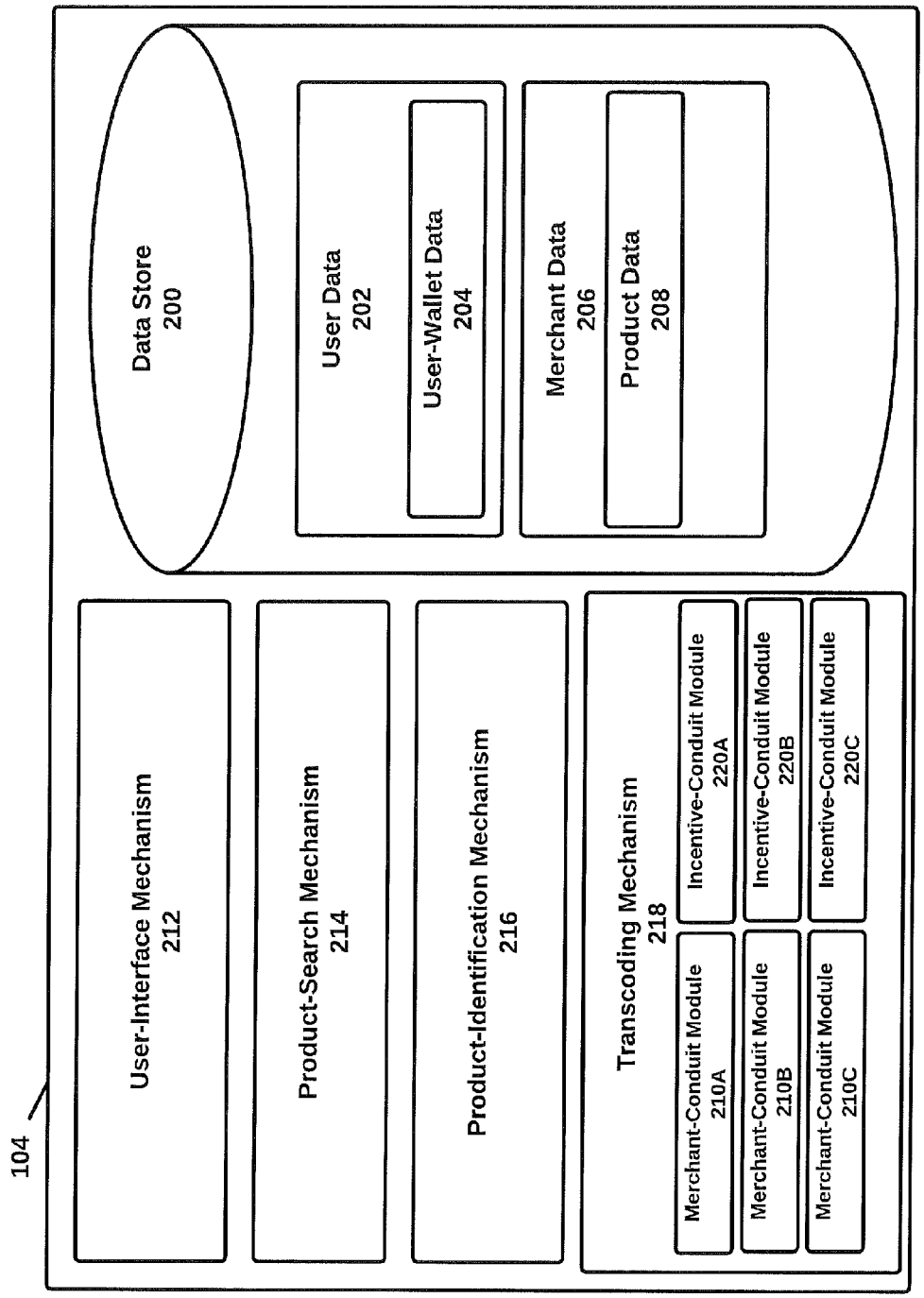
FIG. 2 depicts an architecture overview of a purchase-proxy system according to an example embodiment.

FIG. 2 depicts an architecture overview of PPS 104 according to an example embodiment. PPS 104 may enable a user to conduct a purchase with an online-merchant system via client system 106 by way of purchase-proxy app 108 and/or another access medium. For example, a user may access PPS 104 via purchase-proxy app 108 to search for a product offered by multiple online merchants and, once finding the product at a desired price and a desired merchant, the user may purchase the product. PPS 104 may maintain one or more elements of a user's personal data, such as financial account information and/or fulfillment information, and may complete the purchase with the online merchant on the user's behalf PPS 104 may include data store 200 and may maintain user data 202 and merchant data 206 to enable its functionality. Data maintained by PPS 104 may be encrypted, secured, etc. in order to prevent inappropriate access and fraud. A user identifier may be used to reference the user data 202 of a particular user. For example, a user identifier may be a user's email address, a username, an identification code, a telephone number, other alphanumeric data, etc. A user identifier may reference a user's user wallet and may serve as a user-wallet identifier. User-wallet data 204 may be user data 202 specific to a user, such as credential information (e.g., username, password, passcode, biometric information, etc.), contact information (mailing address, email address, phone number, etc.), demographic data (e.g., sex, age, etc.), reward card data (e.g., loyalty card numbers, frequent shopper card numbers, club membership card numbers, etc.), financial account data (e.g., credit card numbers, security codes, expiration dates, billing addresses, gift card numbers, gift certificate information, etc.), user preferences (e.g., preferred online merchants, preferred fulfillment methods, privacy preferences, etc.), etc. PPS 104 may enable use of various payment methods and financial account data may include, for example, credit card information, checking account information, debit card information, gift card information, gift certificate information, online payment processor account information (e.g., PayPal, Google Checkout, etc.), etc. In one example embodiment, financial account data may include credit account information associated with an entity that manages PPS 104 (e.g., a PPS-specific financial account). As detailed below and illustrated by FIG. 1, in one example embodiment, PPS 104 may store a portion of user data 202 (i.e., user data 202A) while purchase-proxy app 108 may store another portion (i.e., user data 202B).

User-interface mechanism 212 may enable a user to create a user wallet, establish one or more preferences, add, edit, and/or remove user data 202, etc. For example, user-interface mechanism 212 may enable a user to add or delete a financial account from a user wallet, set a default payment account, set default fulfillment options (e.g., a shipping address, a shipping method, in-store pickup, preferred account and/or device for electronic delivery, etc.), establish an address book of shipping addresses, etc. In one example embodiment, purchase-proxy app 108 may interact with user-interface mechanism 212 to enable such functionality. For example, a user may create a user wallet, add or delete a financial account, add or delete a shipping address, etc. via purchase-proxy app 108. PPS 104 may obtain user-wallet data 204 from individual users when they register with PPS 104, and users may update their personal user-wallet data 204 as needed. User-interface mechanism 212 may enable PPS 104 to authenticate users. For example, user-interface mechanism 212 may analyze credentials provided by a user in order to allow the user to access the appropriate user wallet. Additionally, user-interface mechanism 212 may receive product search request from client system 106, enable the communication of search results, enable the receipt of a product and/or merchant selection from client system 106, enable payment initiation from client system 106, etc. In general, user-interface mechanism 212 may enable a user to interact with PPS 104 via client system 106 and/or purchase-proxy app 108.

In one example embodiment, user data 202 is safeguarded in a particular fashion. User data 202 may be stored in a bifurcated manner and encrypted. PPS 104 may maintain a portion of user data (i.e., user data 202A), while the other portion may be maintained at client system 106 (i.e., user data 202B). The data managed by client system 106 may be maintained via purchase-proxy app 108. In one scenario, financial account information and/or fulfillment information is stored in this bifurcated manner. When a user employs client system 106 to conduct a purchase via PPS 104, user data 202A and user data 202B may be decrypted, cached (e.g., into random-access memory [RAM]), and delivered to the appropriate online-merchant system, but the combined data may not be stored. In one example embodiment, the manner in which user data is bifurcated may be predetermined and, for each user, the same, respective portions of user data may be stored at client system 106 and by PPS 104. That is, the data stored by PPS 104 and at client system 106 may be universal amongst PPS users. For example, a user's credit card number may be segmented into two portions. In this example, user data 202A may include one portion of the user's credit card number, and user data 202B may include another portion of the user's credit card number. In another example embodiment, the bifurcation of data is random. That is, the data stored by PPS 104 and at client system 106 may be randomly determined so that the same portion of data stored by PPS 104 and client system 106 is not universal amongst PPS users. For example, for one user, user data 202A may include the first portion of that user's credit card number, while for another user, user data 202A may include the second portion of the second user's credit card number. The randomization may be different for various data elements included in one user's user wallet. For example, if a user has registered two credit card numbers, PPS 104 may store the first portion of the first credit card number, but the second portion of the second credit card number. Furthermore, bifurcated data may be encrypted via any applicable method, such that each element of the bifurcated data may need to be unencrypted prior to being combined.

Data store 200 may maintain merchant data 206 for each merchant with which PPS 104 interacts. Merchant data 206 may pertain to an online merchant and/or a bricks-and-mortar merchant. Merchant data 206 may include a merchant identifier that may be used to reference a particular merchant's data and may be any data employable by PPS 104 to reference the merchant. Merchant data 206 may be submitted by a merchant, acquired by PPS personnel, gathered via one or more automated procedures (e.g., Web crawling, etc.), etc. Merchant data 206 may include data specific to a particular merchant, such as credential information (e.g., for merchant representatives), descriptive data, contact information (e.g., email account information, mailing address, phone numbers, etc.), financial account data, Web site information, etc.

Merchant data 206 may include product data 208 that may include data elements employed by PPS 104 to determine products offered by an online merchant. For example, product data 208 may include product images, Universal Product Codes (UPCs), Stock-keeping unit (SKU) codes, International Article Numbers (EANs), International Standard Book Numbers (ISBNs), other item numbers, price information, descriptive information, product reviews, product condition information (e.g., new, used, etc.), etc. PPS 104 may obtain product data 208 through submissions from users and/or online merchants, by crawling Web sites, etc.

PPS 104 may include product-search mechanism 214 that may enable PPS 104 to determine whether an online-merchant system offers a product requested by a user. A user may communicate a product-search query to PPS 104 via purchase-proxy app 108 or via another channel Product-search mechanism 214 may analyze product data 208 to determine if the product is offered. In addition to, or instead of, analyzing data stored via PPS 104, product-search mechanism 214 may interface with one or more online-merchant systems to determine if the requested product is offered. In one example embodiment, product-search mechanism 214 may interact with transcoding mechanism 218, and a merchant-conduit module associated with an online-merchant system, in order to obtain one or more elements of up-to-date product data, such as price information. Product-search mechanism 214 may interact with product-identification mechanism 216 to ensure that correct products are located.

In one example embodiment, PPS 104 may include product-identification mechanism 216 that may enable PPS 104 to ensure that a particular online-merchant system offers a product. Product-identification mechanism 216 may analyze product data, such as images, names, product attributes, etc. In one example embodiment, product-identification mechanism 216 may match discovered product data to product data 208 maintained by PPS 104. In one scenario, product-identification mechanism 216 may determine whether a discovered product matches a product included in product data 208 based upon a score indicative of similarities. For example, a score may be based upon matched descriptive keywords, image data, specification data, etc. A high score may indicate a likely match. In one scenario, product-identification mechanism 216 may determine an online merchant's SKUs via this procedure. For example, a merchant may not list UPCs or EANs on its standard or mobile Web sites, but may instead list SKUs. If product-identification mechanism 216 determines a product match, it may store the listed SKU with product data 208 in association with another item number (e.g., UPC, EAN, etc.) to enhance subsequent searching. By being able to match an online merchant's SKU with a more generally used code (e.g., UPC, EAN, etc.), product-identification mechanism 216 may enable PPS 104 to communicate correct product data to purchase-proxy app 108 and/or client system 106, thereby ensuring that the correct product data (e.g., image, description, price, etc.) from each appropriate online merchant is presented. Product-identification mechanism 216 may analyze product data upon PPS 104 receiving a user's product search (e.g., in real time), on an ongoing basis (e.g., on a set schedule), per PPS personnel initiation, etc. In one example embodiment, PPS 104 may identify a product as described in U.S. Provisional Patent Application No. 61/670,827, entitled: "System, Method, and Computer-Readable Storage Medium for Identifying a Product," filed Jul. 12, 2012, the content of which is hereby incorporated by reference in its entirety.

PPS 104 may include transcoding mechanism 218 which may enable PPS 104 to interact with online-merchant systems via network 102 in order to enable a user to purchase a product. Transcoding mechanism 218 may enable PPS 104 to communicate user-wallet data (e.g., a credit card number, shipping address, billing address, security code, credit card expiration date, user name, phone number, email address, etc.) to an online-merchant system. Transcoding mechanism 218 may enable PPS 104 to provide user-wallet data to an online-merchant system via a selectable type of interface to the online-merchant system. For example, transcoding mechanism 218 may enable PPS 104 to provide user-wallet data via an application programming interface (API) and/or via automated data entry in a manner akin to user entering data into a user interface, such as a standard Web site (e.g., a Web site formatted for a traditional Web browser), and/or a mobile user interface, such as a mobile Web site (e.g., a Web site formatted for a mobile Web browser). For example, the transcoding mechanism 218 may include a merchant-conduit module to provide user-wallet data into Web site's sign-in screen, shipping address selection screen, shipping method selection screen, payment information screen, and purchase confirmation screen.

The merchant-conduit module of the transcoding mechanism 218 may enable PPS 104 to serve as a purchase proxy for user for an online-merchant system. For example, as depicted for illustrative purposes in FIG. 1 and FIG. 2, transcoding mechanism 218 may include merchant-conduit module 210A, merchant-conduit module 210B, and merchant-conduit module 210C to enable PPS 104 to interact with online-merchant system 110A, online-merchant system 110B, and online-merchant system 110C, respectively. A merchant-conduit module may include instructions regarding the preferred method for interacting with an online-merchant system. An online-merchant system may enable a party, such as a user or an online service, to interact with it via various types of selectable communication channels or interfaces of the respective online-merchant system. An interface may be an electronic, interactive medium by which one or more portions of user-wallet data may be input into a merchant system in order to obtain data regarding a product offered. The data obtained may include data relevant to the purchase of the product, such as merchant data, price data, fulfillment data, etc. For example, an interface may be an API, a user interface (e.g., standard Web site), a mobile user interface (e.g., a mobile Web site, a mobile app, etc.) and/or any other channel or interface. A merchant-conduit module may enable transcoding mechanism 218 to interact with any type of uniform resource locator (URL) associated with an online-merchant system. For example, a merchant-conduit module may specify a URL not publicly known, but accessible via a merchant-specific app. Additionally, or alternatively, a merchant-conduit module may simulate a merchant's app, allowing PPS 104 to interact with an online-merchant system as if it was the merchant's app. Because an online merchant may not mind that a sale originates from an outside source, the online merchant may be willing to share this type of information with the PPS service provider.

Transcoding mechanism 218 may include an incentive-conduit module to enable PPS 104 to interact with an incentive system. For example, as depicted for illustrative purposes in FIG. 1 and FIG. 2, transcoding mechanism 218 may include incentive-conduit module 220A, incentive module 220B, and incentive-conduit module 220C to enable PPS 104 to interact with incentive system 114A, incentive system 114B, and incentive system 114C, respectively. Similar to a merchant-conduit module, an incentive-conduit module may include instructions regarding the preferred type of interface for interacting with an incentive system (e.g., an API, a user interface, a mobile user interface, and/or any other channel or interface). An incentive-conduit module may enable PPS 104 to employ incentive data obtained from an incentive system in order to present a user with product pricing that includes the application of an incentive, to apply an incentive to a purchase conducted by the user via PPS 104, etc. As described herein, a "conduit module" may generally refer to either a merchant-conduit module or an incentive-conduit module.

A conduit module may indicate one or more interfaces to be used when PPS 104 conducts a purchase on behalf of a user. The particular interfaces used for one or more procedures may be determined based upon each interface's efficiency, reliability, etc. for the desired procedure. For example, merchant-conduit module 210A may interact with online-merchant system 110A via an API to determine a product's current price, via a user interface (e.g., standard Web site) to determine fulfillment options and costs and tax, and via a mobile user interface (e.g., a mobile Web site) to finalize a purchase. Which interfaces are to be used and in which fashion may be established by PPS personnel and/or via an automated process. The manner in which interfaces are accessed may enable transcoding mechanism 218 to avoid one or more obstacles that it may encounter when accessing and/or inputting data at an online-merchant system. A conduit module may instruct transcoding mechanism 218 to employ one or more interfaces simultaneously. As detailed below, by serving as a proxy for a user and inputting data as a user, PPS 104 may be able to determine fulfillment data (e.g., shipping costs, shipping options, in-store pick availability, electronic delivery options for digital products, etc.), price data (e.g., product cost, taxes, etc.), applicable incentives, etc. prior to a user completing the purchase.

In addition to enabling the purchase of a product, a merchant-conduit module may enable transcoding mechanism 108 to obtain up-to-date product data from the associated online-merchant system. For example, when a user employs product proxy app 108 to search for a product, a merchant-conduit module may access its associated online-merchant system to determine whether the system has the sought after product and/or to obtain current product data, such as the current price.

PPS 104 may use a conduit module to monitor changes in one or more Web pages accessible via the corresponding online-merchant or incentive system. In one example embodiment, a merchant-conduit module may enable PPS 104 to Web crawl an online merchant's Web site. If a merchant-conduit module detects a change in the online-merchant system's purchase processes, PPS personnel may be alerted and PPS 104 may suspend its payment procedures with the online-merchant system until the matter has been resolved. When a merchant-conduit module detects a change, it may store data indicative of the change so that PPS personnel may readily determine the effect(s) of the change. For example, the Hypertext Markup Language (HTML) of a changed Web page may be stored and compared against the HTML of the Web page prior to the change.

Although PPS 104 may be configured to serve as a purchase proxy for one or more online-merchant systems, it may also interact with one or more online-merchant systems for which it does not have a merchant-conduit module. For such online-merchant systems, PPS 104 may enable client system 106 and/or purchase-proxy app 108 to present merchant and product data, but, upon the selection of such an online merchant, instead of accomplishing payment on the user's behalf, PPS 104 may direct client system 106 and/or purchase-proxy app 108 to navigate a user to the selected online merchant's payment system (e.g., the merchant's mobile or standard checkout Web page). Similarly, PPS 104 may interact with one or more bricks-and-mortar merchant systems. Upon the selection of a bricks-and-mortar merchant, PPS 104 may direct client system 106 and/or purchase-proxy app 108 to present data regarding the bricks-and-mortar merchant, such as its address, phone number, driving directions, Web site, etc.

Conducting a Purchase Via a Purchase-Proxy System

Figure 3:
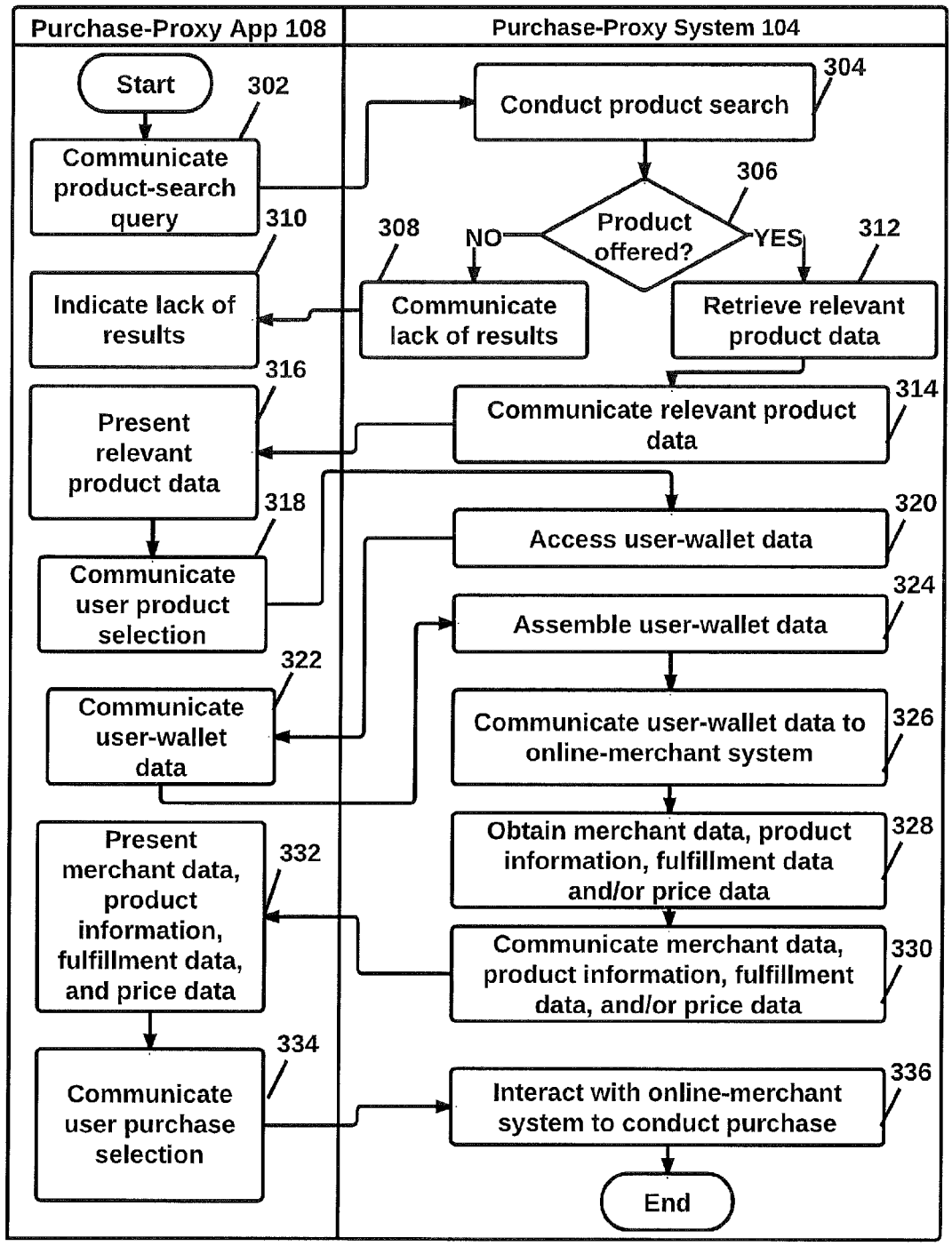
FIG. 3 depicts a flowchart of a process of a purchasing a product from an online merchant via a purchase-proxy system according to an example embodiment.

FIG. 3 depicts a flowchart of a process of a purchasing a product from an online merchant via PPS 104 according to an example embodiment. FIG. 3 is described in terms of purchase-proxy app 108 interacting with PPS 104. This is not to be construed as limiting and it should be understood that other implementations are possible. For example, client system 106 may interact with PPS 104 via a Web browser, a Web browser plug-in, a software application, a mobile app, etc.

Purchase-proxy app 108 may receive a product-search query entered by a user and communicate it to PPS 104 (step 302). A user may initiate a product search by entering one or more keywords into purchase-proxy app 108, using purchase-proxy app 108 and/or client system 106 to scan a bar-code or a matrix code [e.g., a Quick Response (QR) code], etc. As indicated, purchase-proxy app 108 may be an app installed on portable computing device, such as a smartphone or tablet computer. PPS 104 may receive the product-search query and conduct a product search based upon it (step 304) to determine if the requested product is offered by an online-merchant system (step 306). In one example embodiment, PPS 104 may access its own records (e.g., data maintained in data store 200) to determine whether an online merchant offers a product associated with the query. Additionally, or alternatively, PPS 104 may interface with one or more online-merchant systems to determine whether a relevant product is offered and/or to determine current product data. For example, PPS 104 may employ a merchant-conduit module to access an online-merchant system to obtain up-to-date information, such as availability, regarding a sought after product. If PPS 104 determines that a relevant product is not offered by an online-merchant system, PPS 104 may communicate the lack of results to purchase-proxy app 108 (step 308), and purchase-proxy app 108 may indicate this to the user (step 310). The user may provide a new or refined product-search query, and PPS 104 may search again.

If PPS 104 determines that one or more online-merchant systems offer products relevant to the search query, it may retrieve relevant product information, such as names, images, etc., from its data store 200 and/or from the appropriate online-merchant systems (step 312). PPS 104 may communicate the relevant product data to purchase-proxy app 108 (step 314). Purchase-proxy app 108 may present the relevant product data to the user (step 316), thereby enabling the user to select a desired product. For example, if the product-search query included the keyword "diapers," the relevant product information may include a variety of diaper brands, sizes, etc. and purchase-proxy app 108 may present a listing of the available diaper products from which the user may select.

A user may select a product, and purchase-proxy app 108 may communicate the selection to PPS 104 (step 318). PPS 104 may access user-wallet data for the user (step 320). PPS 104 may determine the appropriate user wallet based upon a user-wallet identifier received from purchase-proxy app 108. The user-wallet identifier may be communicated to PPS 104 when purchase-proxy app 108 is initialized, when PPS 104 receives a product-search query, when PPS 104 receives the user selection, or any other suitable time. As aforementioned, although PPS 104 may store elements of user-wallet data, user-wallet data may be stored in a bifurcated fashion between PPS 104 and purchase-proxy app 108 (and/or client system 106). As such, when PPS 104 accesses user-wallet data, it may access data from data store 200 (e.g., user data 202A) as well as data maintained by purchase-proxy app 108, and/or client system 106 (e.g., user data 202B). Once purchase-proxy app 108 communicates the necessary user-wallet data to PPS 104 (step 322), PPS 104 may assemble the user-wallet data (step 324). For example, PPS 104 may combine partial credit card information and/or fulfillment information stored within data store 200 with partial credit card information and/or fulfillment information maintained via purchase-proxy app 108. If all necessary user-wallet data is stored in one location (e.g., by PPS 104, client system 106, or purchase-proxy app 108), PPS 104 may access the one source and need not assemble user-wallet data before communicating it to an online-merchant system.

PPS 104 may communicate the necessary elements of the user-wallet data to the online-merchant system(s) offering the selected product (step 326). Additionally, or alternatively, PPS 104 may access merchant data and/or product data it maintains. PPS 104 may communicate user-wallet data to an online-merchant system via a merchant-conduit module, thereby obtaining one or more elements of product information, fulfillment data, and price data (e.g., a product's current cost, tax data, etc.). As described in relation to FIG. 2, a merchant-conduit module may communicate user-wallet data via one or more interfaces, such as via an API, a user interface (e.g., an online merchant's standard Web site), a mobile user interface (e.g., an online merchant's mobile Web site, a mobile app, etc.), and/or any other channel. PPS 104 may need to perform multiple steps with the online-merchant system in order to communicate the user-wallet data. For example, PPS 104 may use automated data entry to add the selected product to a virtual shopping cart on one Web page, enter a shipping address on another Web page, payment information on another, and so on until it obtains fulfillment data and/or price data. In one example embodiment, PPS 104 may obtain all fulfillment option data from the online-merchant system when it initially contacts it. For example, PPS 104 may obtain data indicative of the shipping carriers offered (e.g., mail service, UPS, FedEx, etc.), shipping service types (e.g., budget, standard, express, etc.), options for in-store pickup, options for the electronic delivery of digital goods or services, etc. In another example embodiment, PPS 104 may obtain alternate fulfillment option data and/or price data if the user subsequently requests it.

If the user has previously interacted with an online-merchant system, PPS 104 may access an appropriate login credential stored in association with the user's user-wallet data. If not, PPS 104 may generate a user account and appropriate login credential with the online-merchant system in order to obtain the necessary data. PPS 104 may store the generated login credential in association with the user's user-wallet data and employ the credential during subsequent uses. In an alternate example embodiment, a user himself may register with PPS 104 login credentials for one or more online-merchant systems.

Although not depicted by FIG. 3, as aforementioned, PPS 104 may interact with merchant systems for which it does not have a merchant-conduit module in order to obtain product data. For such online merchants and bricks-and-mortar merchants, PPS 104 may not communicate user-wallet data and may retrieve product data via other various procedures, such as Web crawling, etc.

In one example embodiment, PPS 104 may interact with one or more incentive systems in order to determine if an incentive system is offering an incentive relevant to the desired product and/or a relevant merchant. As mentioned, PPS 104 may be enabled to interact with an incentive system via an incentive-conduit module. As with online-merchant systems, if needed, PPS 104 may generate a user account and appropriate login credential with the incentive system in order to obtain incentive data. For example, PPS 104 may access Groupon to determine if there is a relevant incentive and, if so, may create a Groupon account in order to obtain incentive data.

Once PPS 104 has obtained merchant data, product information, fulfillment data, and/or price data (and, optionally, incentive data) (step 328), it may communicate this data to purchase-proxy app 108 (step 330). In one example embodiment, if, through its communication of user-wallet data to an online-merchant system, PPS 104 has fully prepared a product purchase with the online-merchant system, PPS 104 may maintain the prepared purchase with the online-merchant system, thereby enabling PPS 104 readily to conduct the purchase if the user chooses to do so (as described below). As mentioned, PPS 104 may obtain merchant data and product data from merchants for which it does not have a merchant-conduit module. This merchant data and product data also may be communicated to purchase-proxy app 108, thereby enabling the user to view product data available from both merchants for which PPS 104 has merchant-conduit modules and those for which it does not.

Purchase-proxy app 108 may present merchant data, product information, fulfillment data, and/or price data (and, optionally, incentive data) to the user (step 332). Merchant data may identify the online-merchant system; product information data may include descriptive data, image data, review data, etc.; fulfillment data may indicate delivery options (e.g., shipping options, electronic delivery options, etc.) and fulfillment costs; price data may indicate a product's cost and tax costs; and incentive data may indicate one or more relevant incentives and how they affect the purchase. This information may enable the user to view the total costs before making a purchase. In one scenario, purchase-proxy app 108 may present a list displaying each online merchant offering the product, each online merchant's price for the product and the condition of the product (e.g., new or used). The list may be sorted by price (e.g., lowest to highest), merchant name, condition, etc. As aforementioned, PPS 104 may provide product data for online-merchant systems for which it is not enabled to serve as a purchase proxy. The merchant data, product information, and/or price data presented may indicate whether a user can purchase the product via purchase-proxy app 108 or not. For example, products available for purchase via purchase-proxy app 108 may be highlighted in some fashion. Further possible implementations of the display of purchase-proxy app 108 are described below in relation to FIGS. 4A-4G.

Purchase-proxy app 108 may enable a user to change a fulfillment option before or after the user has viewed the associated costs. For example, a user may change the shipping carrier, the shipping service type (e.g., from standard service to express service), etc. If purchase-proxy app 108 has already received the fulfillment data required for a newly-selected fulfillment option, it may present it. If not, purchase-proxy app 108 may instruct PPS 104 to obtain data regarding the newly-selected fulfillment option so that it may be presented. Furthermore, a user may change the payment method (e.g., select a different credit card), and/or delivery option (e.g., shipping address, electronic delivery location, etc.). A user may establish default payment and fulfillment information with purchase-proxy app 108, and may simply review the purchase information if the user wishes to employ these defaults. In one scenario, purchase-proxy app 108 may default to the most inexpensive fulfillment option.

Once a user is satisfied with the purchase options, the user may indicate a desire to purchase the product, which the purchase-proxy app 108 may communicate to PPS 104 (step 334). In one example embodiment, a user may perform a single action to initiate the purchase, such as by performing a gesture action on a touchscreen of client system 106. In one scenario, the user may slide a finger across the touchscreen of a portable computing device in order to initiate the purchase. Prior to completing a purchase, a user may be prompted to provide a passcode, password, or other credential in order to complete the transaction. This may prevent accidental or fraudulent purchases.

PPS 104 may interact with the appropriate online-merchant system in order conduct the purchase (step 336). As when obtaining merchant data, product information, fulfillment data, and/or price data, PPS 104 may provide user-wallet data (and, optionally, incentive data) to the online-merchant system 104 and, in one example embodiment, does so via a merchant-conduit module. If PPS 104 was able to maintain a previously-prepared purchase with the online-merchant system, PPS 104 may finalize it. If not, PPS 104 may complete a total purchase procedure. If PPS 104 is not enabled to conduct a purchase via the selected online merchant (e.g., it does not have a merchant-conduit module for the selected online merchant), client system 106 may activate a Web browser, a merchant-specific app, etc., and the user may conduct the purchase with the merchant directly. If the merchant is a bricks-and-mortar merchant, the user may be presented with data regarding the merchant's location, hours of operation, phone number, Web site, etc.

Purchase-Proxy App User Interface

Figure 4B:
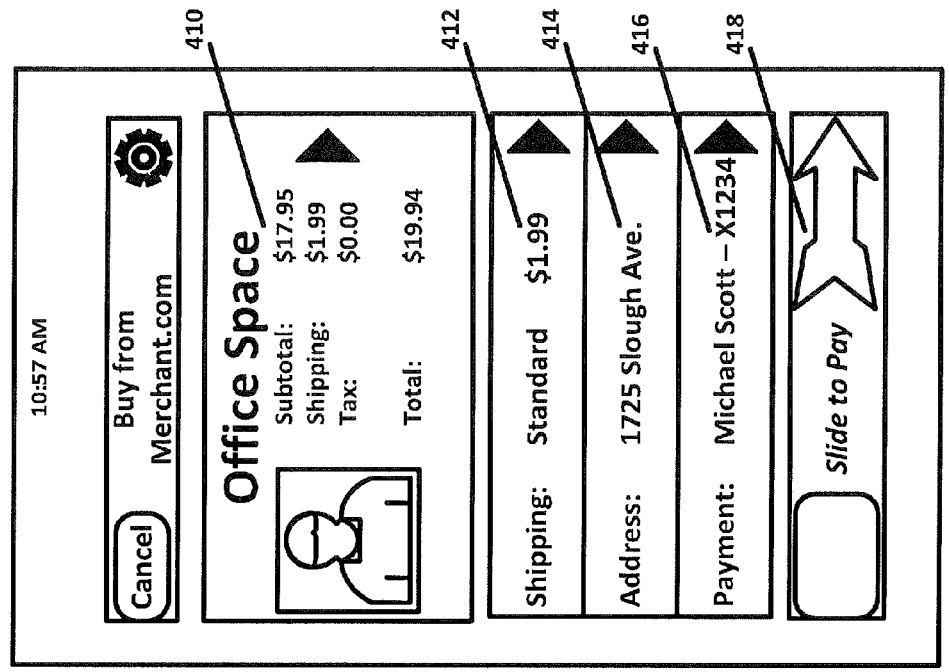
FIGS. 4A-4G depict an overview of a user interface of a purchase-proxy app configured to facilitate a purchase from an online-merchant system via a purchase-proxy system, according to an example embodiment.
Figure 4A:
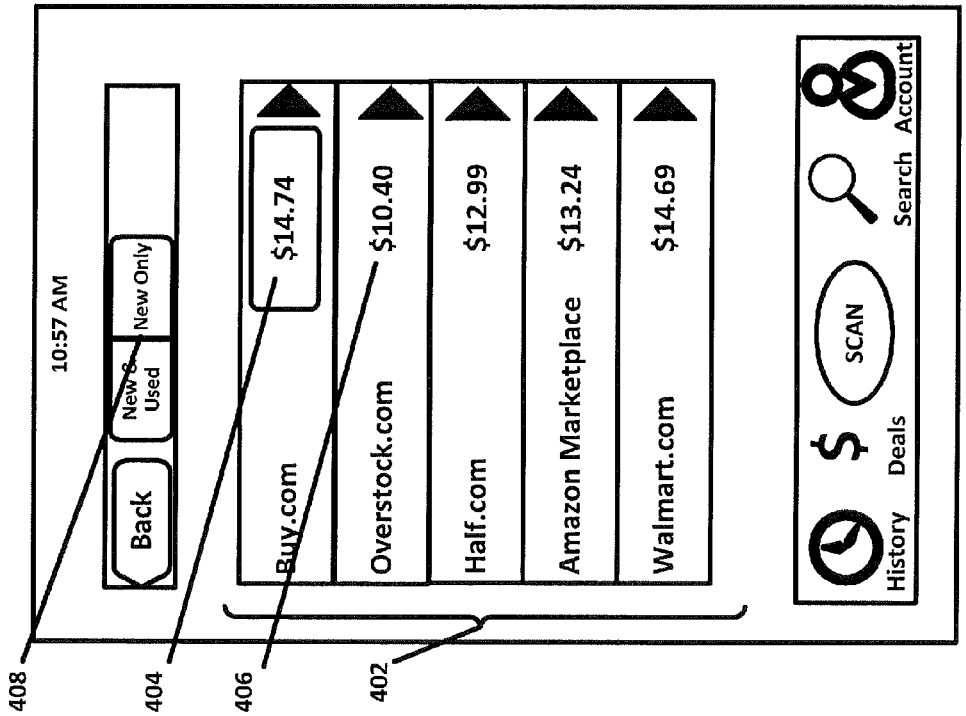

FIGS. 4A-4G depict an overview of an example user interface of purchase-proxy app 108 configured to facilitate a purchase from an online-merchant system via a PPS 104. FIG. 4A depicts an example of a product result screen that, in one example embodiment, may be the screen presented by purchase-proxy app 108 once PPS 104 has obtained merchant data, product information, fulfillment data, and/or price data for a selected product (e.g., FIG. 3, step 332). As shown, the user interface may include merchant listing 402 which may indicate the merchants offering the selected product and their price for the product. The price listed may include a fulfillment (e.g., shipping) charge and/or tax. FIG. 4A illustrates an example of how purchase-proxy app 108 may indicate merchants for which it may serve as a payment proxy and those it may not. In FIG. 4A, PPS 104 includes a merchant-conduit module for Buy.com and indicates this by portraying the price as a highlighted price button 404. As in this example, PPS 104 does not have merchant-conduit modules for the other merchants, so their prices are presented as non-highlighted prices 406. Product condition selection interface 408 may enable a user to toggle the display to present new products, used products, and/or new and used products.

If the user selects a merchant not enabled to conduct a payment via PPS 104, client system 106 may be instructed to open the merchant's standard or mobile Web page via a Web browser. FIG. 4B illustrates an example of a purchase screen presented when a user has selected a merchant from merchant listing 402 for which PPS 104 is enabled to conduct a purchase (e.g., when a user selects highlighted price button 404). The purchase screen may include purchase summary 410 which may detail the price of the product, the fulfillment charge, the tax charge, and the total cost. The purchase screen may include fulfillment option interface 412, shipping address interface 414, and payment method interface 416. Once a user has established his fulfillment and payment preferences, he may use purchase initiation interface 418 to instruct PPS 104 to conduct a purchase. As depicted in FIG. 4B, in one example embodiment, a user may use a gesture movement, such as by sliding a finger across the touchscreen of client system 106, to initiate the purchase.

Figure 4D:
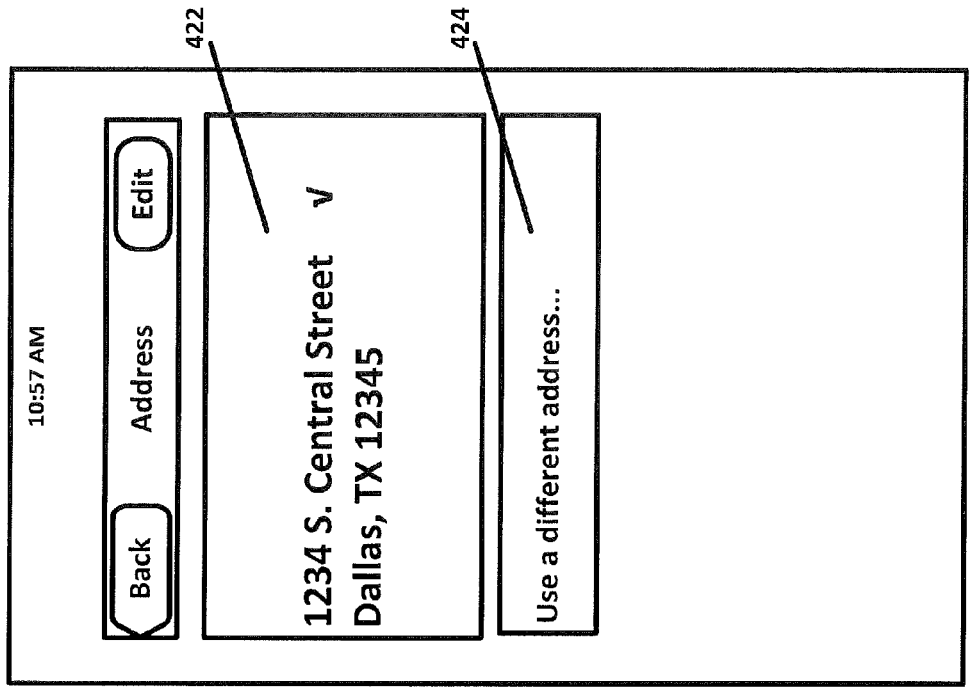
Figure 4C:
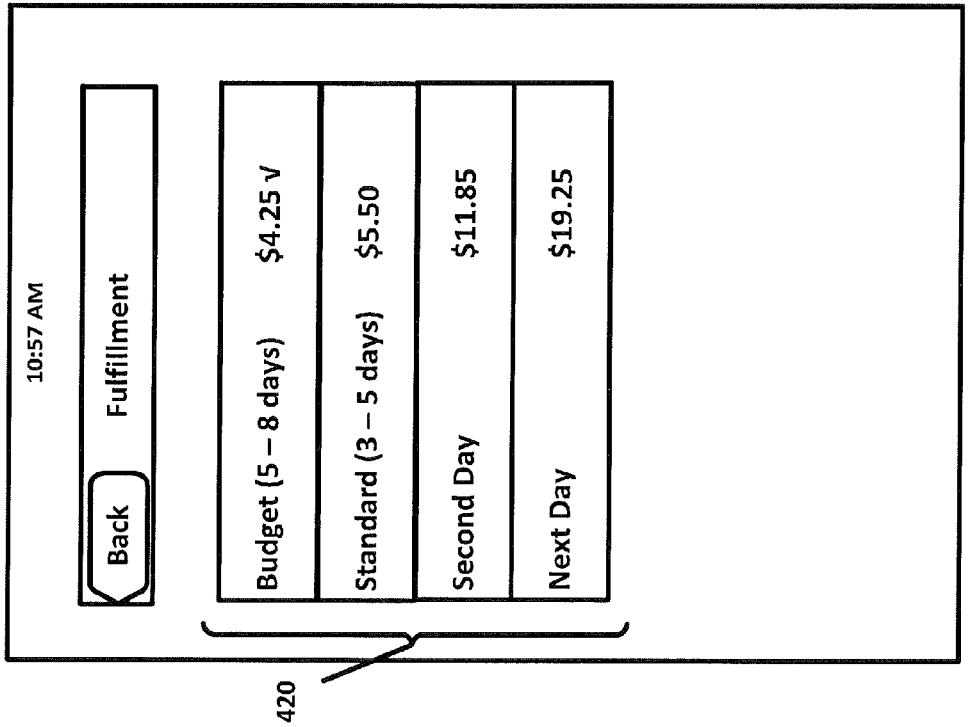

If the user wishes to change the fulfillment option for his purchase, he may select fulfillment option interface 412 and be presented with a fulfillment option selection screen, such as the one depicted in FIG. 4C. The fulfillment option selection screen may include fulfillment option listing 420 indicating one or more fulfillment services available from the associated merchant and their costs. In one example embodiment, a user may have a default fulfillment option, such as the least expensive or a fulfillment preference set by the user. If the user wishes to select another fulfillment option, he may do so and product summary 410 may be updated to reflect this change.

If the user wishes to change the shipping address for his purchase, he may select shipping address interface 414 shown in FIG. 4B and be presented with a shipping address screen, such as the one depicted in FIG. 4D. The shipping address selection screen may include address listing 422 that may include one or more addresses that the user has registered. If the user wishes to use an address not listed, he may select address registration interface 424, which may enable the user to provide a new address which may be added to the user's user wallet and to address listing 422. In one example embodiment, the user may have a default shipping address, such as a home address or another address preference set by the user. If the user wishes to select another address, he may do so, and product summary 410 may be updated to reflect this change (e.g., the fulfillment cost may change based upon the newly-selected address).

Figure 4F:
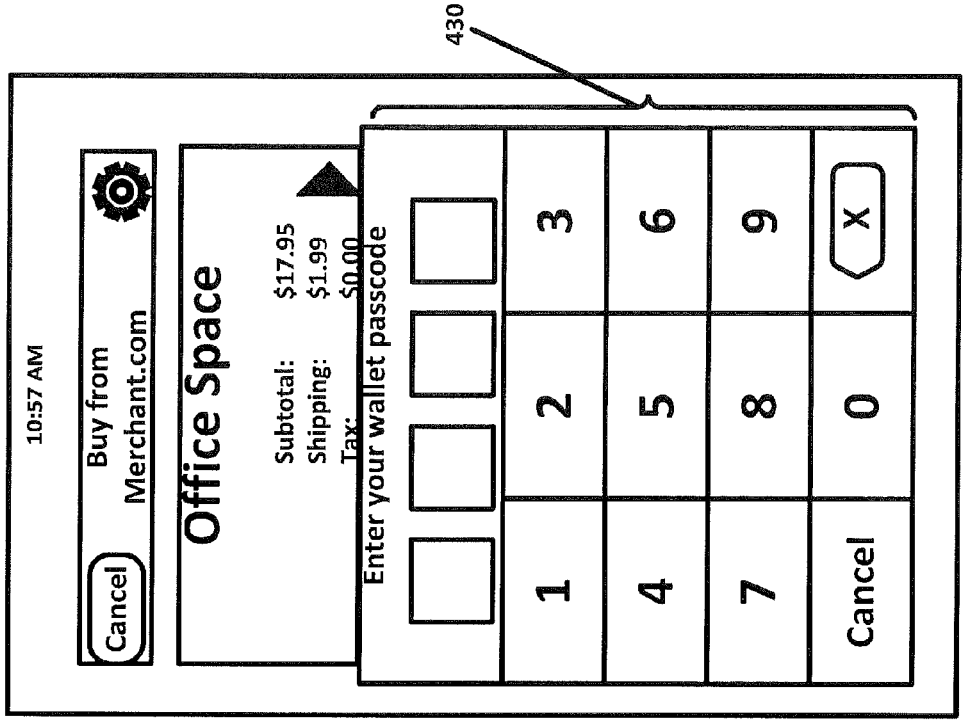
Figure 4E:
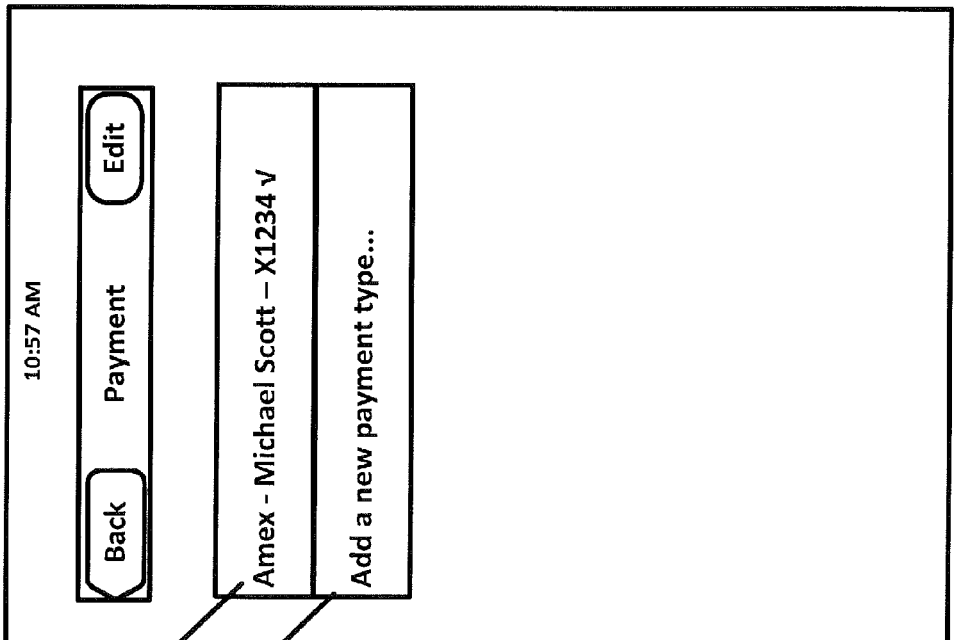

If the user wishes to change the payment method for his purchase, he may select payment method interface 416 shown in FIG. 4B and be presented with a payment method selection screen, such as the one depicted in FIG. 4E. The payment method selection screen may include payment method listing 426 that may include one or more payment methods that the user has registered. If the user wishes to use a payment method not listed, he may select payment method registration interface 428, which may enable the user to provide a new payment method which may be added to the user's user wallet and to payment method listing 426. In one example embodiment, the user may have a default payment method.

Figure 4G:
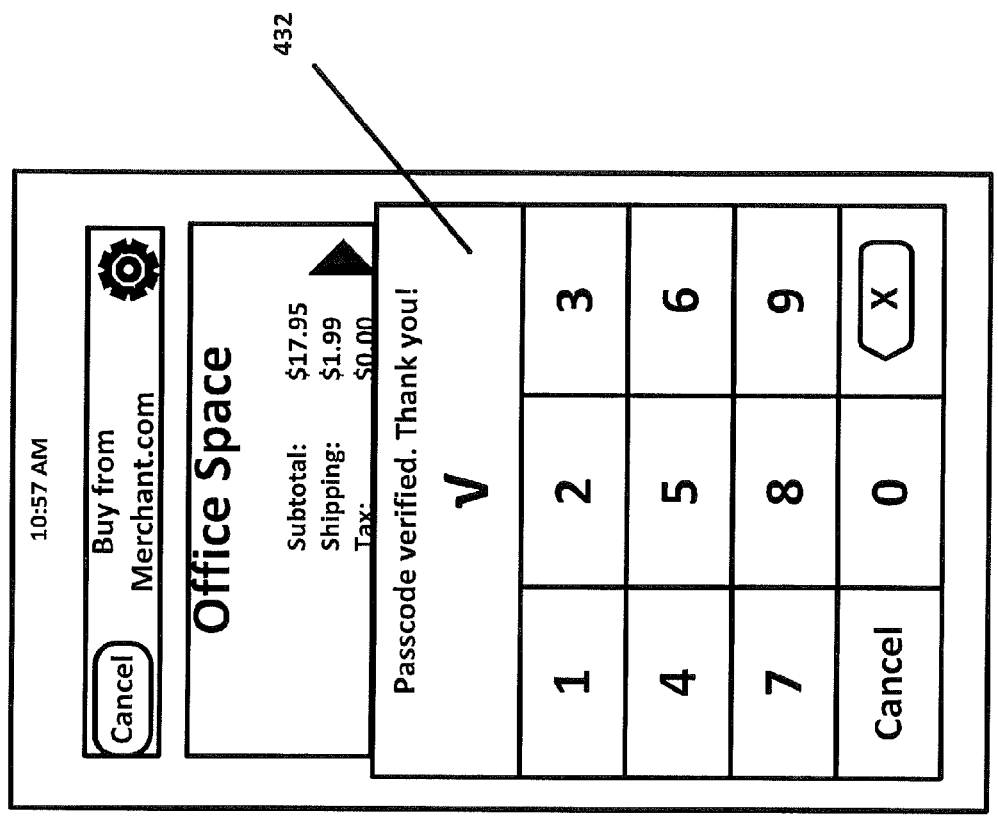

Once the user has interacted with purchase initiation interface 418 shown in FIG. 4B to instruct PPS 104 to conduct a purchase with his user-wallet data, the user may be presented with purchase authorization interface 430. FIG. 4F depicts an example of purchase authorization interface 430 in which a user is prompted to provide a four-digit passcode. This is for illustrative purposes and is not to be construed as limiting and it is to be understood that purchase authorization interface 430 may be configured to receive any type of authorization credential. As depicted in FIG. 4G, once a user's authorization credential has been verified, purchase authorization interface 430 may present authorization indication message 432 and PPS 104 may conduct the desired purchase on behalf of the user.

In addition to the aforementioned functionalities, PPS 104 may enable other functions. The following are a sampling of additional or alternative features PPS 104 may enable.

Gifted Financial Account Access

PPS 104 may enable a user to grant another individual access to a financial account registered in the user's user wallet. In one scenario, the granted access may be a "gift access" and may be restricted so that the sharing of access simulates a gift card or gift certificate scenario. When a user wishes to provide another individual with gift access, the giving user may select one of his registered financial accounts (or register a new payment method), establish a monetary value limit for the gift access (e.g., $50.00), a time limit (e.g., 30 days), and/or other restrictions and/or stipulations. PPS 104 may relay an authorization indication to the recipient. For example, PPS 104 may communicate (e.g., via email, a text message, etc.) a link, a gift code, etc. to the recipient and/or may provide a link or gift code to the giver so that he may communicate it to the recipient. The recipient may be required to be an existing PPS user or may be required to enroll with PPS 104 in order to obtain the gift access.

Once the recipient has accessed the authorization indication (e.g., click a received link, entered the received gift code into purchase-proxy app 108, etc.), the giver's selected financial account may be associated with the recipient's user wallet. The recipient may then employ the gifted access as a payment method when conducting a purchase via PPS 104. The giver's financial account may not be debited until the recipient uses the gift access to make a purchase. For example, when the recipient attempts to purchase a product via PPS 104, he may select the gift access as his payment method. PPS 104 may provide the appropriate online-merchant system with the recipient's fulfillment option selection and address via a merchant-conduit module, but provide the giver's financial account data associated with the gifted access. In one example embodiment, the recipient is prohibited from viewing the actual financial account data associated with the gift access, thereby ensuring the security of the shared access.

Gift Registry

PPS 104 may enable a user to create a gift registry (also called a "wish list") that may be shared with other individuals. For example, the gift registry may be shared via a link, may be accessible via the user's username, email address, or phone number, etc. When an individual wishes to purchase a product from the user's gift registry, he may access PPS 104 (registering with PPS 104 if necessary), access the user's gift registry, select a product, and complete the purchase via PPS 104. As PPS 104 has access to the user's delivery information (e.g., shipping address, electronic devices, etc.) via his user-wallet data, PPS 104 may provide the delivery information to the online-merchant system, thereby alleviating the need for the purchasing user to provide it.

Price Monitoring

PPS 104 may be configured to monitor changes to product data, such as price, presented by online-merchant systems. A user may indicate (to PPS 104) a desired price threshold for a particular product. When PPS 104 determines that the product's price has reached the established threshold, it may alert the user via an electronic communication and/or may automatically purchase the product on behalf of the user.

Online Payment Option

PPS 104 has been described primarily as being implemented as a way to enable payment via an app. PPS 104 also may be available as a payment option when a user conducts a purchase with an online-merchant system directly. For example, when a user accesses an online merchant's standard or mobile Web site, he may be allowed to select PPS 104 as a payment option (e.g., in addition to being able to use more traditional payment methods, such as credit cards, PayPal, etc.). If the user selects PPS 104 as his payment method, he may be prompted to provide credentials in order to enable PPS 104 and the online-merchant system to interact. PPS 104 may provide the online-merchant system with the user's registered financial account data, fulfillment option preferences, and/or shipping address, thereby alleviating the need for the user to provide this information himself.

In one example embodiment, once a user has selected PPS 104 as a payment method and has provided credentials to PPS 104 to identify his user wallet, PPS 104 may instruct purchase-proxy app 108 to activate on client system 106. The user may provide authorization for the purchase via purchase-proxy app 108. PPS 104 may determine the user's particular installation of purchase-proxy app 108 via a user identifier (e.g., phone number, email address, identification code, etc.) associated with his user-wallet data. For example, a user may access an online-merchant system via a Web browser on his desktop computer. During the checkout process, if the user selects PPS 104 for the payment method, PPS 104 may employ a user identifier to trigger purchase-proxy app 108 to open on the user's client system 106 (e.g., smartphone, tablet computer, etc.) and purchase-proxy app 108 may prompt the user to input an authorization credential in order to allow PPS 104 to provide the online-merchant system with his payment and fulfillment information.

Merchant-Specific PPS

In one example embodiment, PPS 104 may interact with an online-merchant system so that a user may employ his PPS user wallet as his electronic wallet for the online merchant instead of the online merchant's own electronic-wallet system. Rather than generating an electronic wallet specific to the online merchant, the online-merchant system may be configured to receive a user's PPS login credentials and thereby allow the user to employ his PPS user wallet instead, or in addition to, the online-merchant system's own electronic-wallet function.

Merchant Evaluation

PPS 104 may include one or more functions that enable it to evaluate merchant systems. In one example embodiment, PPS 104 may maintain a registry of preferred merchants, disliked merchants, prohibited merchants, etc. PPS 104 may be configured to receive feedback from users, such as complaints, compliments, etc. This may be received via an automated feedback function, such as a scoring or rating function, via a comment interface, etc. Additionally or alternatively, PPS 104 may monitor analytical data obtained via merchant-conduit modules, Web crawling, and input by PPS personnel. For example, PPS 104 may analyze the competitiveness, appropriateness, etc. of a merchant's prices, fulfillment options, fulfillment costs, etc.

User feedback data and/or analytical data may be used to generate a performance score indicative of a merchant's costs, service, reliability, etc. A merchant's performance score may affect how or if PPS 104 interacts with the associated merchant system. For example, a lower performance score may indicate that an online merchant has received a large amount of negative user feedback, that PPS 104 has determined that the online merchant's fulfillment costs are excessive, that PPS 104 has determined that the online-merchant system is unreliable, etc. A higher performance score may indicate positive user feedback, competitive product pricing, competitive fulfillment costs, etc. If a merchant has a low performance score, PPS 104 may cease to interact with the associated merchant system or may only do so if no other merchant systems offers the sought after product. Conversely, if a merchant has a high performance score, PPS 104 may be configured to offer the merchant as a purchase option more often than those with lower performance scores. In one example embodiment, PPS 104 may allow users to view merchant performance scores (e.g., a performance score may be presented in conjunction with the merchant's price for a queried product).

According to example embodiments of the present invention, components of merchant network 100 including purchase-proxy system 104, client system 106, online-merchant system, bricks-and-mortar merchant system and incentive system may be implemented by various means. Means for implementing the systems, mechanisms and modules may include hardware, alone or under direction of one or more computer program code instructions, program instructions or executable computer-readable program code instructions from a computer-readable storage medium.

In one example, one or more apparatuses may be provided that are configured to function as or otherwise implement the systems, mechanisms and modules shown and described herein. Generally, an apparatus of exemplary embodiments of the present invention may comprise, include or be embodied in one or more fixed or portable computing devices, a number of examples of which are provided above. The apparatus may include one or more of each of a number of components such as, for example, a processor connected to memory.

The processor is generally any piece of hardware that is capable of processing information such as, for example, data, computer-readable program code, instructions, etc. (generally "computer programs," e.g., software, firmware, etc.), and/or other suitable electronic information. More particularly, for example, the processor may be configured to execute computer programs, which may be stored onboard the processor or otherwise stored in the memory. The processor may be a number of processors, a multi-processor core or some other type of processor, depending on the particular implementation. In another example, the processor may be embodied as or otherwise include one or more application-specific integrated circuits (ASICs), field-programmable gate arrays (FPGAs), etc. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information. The memory may include volatile memory and/or non-volatile memory, and may be fixed or removable. Examples of suitable memory include random access memory (RAM), read-only memory (ROM), a hard drive, a flash memory, a thumb drive, an optical disk, a magnetic tape or some combination of the above. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface and/or one or more user interfaces. The communications interface may be configured to transmit and/or receive information, such as to and/or from other apparatus(es), network(s), etc. The communications interface may be configured to transmit and/or receive information by physical (wireline) and/or wireless communications links.

The user interfaces may include a display and/or one or more user input interfaces. The display may be configured to present or otherwise display information to a user, suitable examples of which include a liquid crystal display (LCD), light-emitting diode display (LED), plasma display panel (PDP), etc. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), etc. The user interfaces may further include one or more interfaces for communicating with peripherals such as printers, scanners, etc.

As indicated above, program code instructions may be stored in memory, and executed by a processor, to implement functions of the systems, mechanisms and modules described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Execution of the program code instructions may produce a computer-implemented process such that the instructions executed by the computer, processor or other programmable apparatus provide operations for implementing functions described herein.
Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

A system, method, and computer-readable storage medium for enabling an individual to use a purchase-proxy mechanism to conduct a financial transaction from a computing device with an online merchant, whereby the individual is enabled to use stored personal data without having to store the personal data with the online merchant has been illustrated. It will be appreciated by those skilled in the art that the system, method, and computer-readable storage medium of the present invention may be used to employ a computing device to purchase a product from an online merchant via a proxy system. It will thus be appreciated by those skilled in the art that other variations of the present invention will be possible without departing from the scope of the example embodiments of the present invention disclosed.

These and other aspects of example embodiments of the present invention should be apparent to those skilled in the art by a review of the preceding detailed description. Although a number of salient features of example embodiments of the present invention have been described above, the present invention is capable of other embodiments and of being practiced and carried out in various ways that would be apparent to one of ordinary skill in the art after reading the disclosed example embodiments of the present invention. Therefore, the description should not be considered to be exclusive of these other embodiments. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. For example, different combinations of elements and/or functions than those explicitly described above are also contemplated as may be set forth in some of the appended claims. Also, it is to be understood that the phraseology and terminology employed herein are for the purposes of description and should not be regarded as limiting.

What is claimed is:

1. A purchase-proxy computer for interacting with at least a first online merchant system associated with a first merchant and a second online merchant system associated with a second merchant, the purchase-proxy computer comprising:
    a processor; and
    a memory storing executable instructions that, in response to execution by the processor, cause the purchase-proxy computer to at least:
        receive a product-purchase request from a client device, the product-purchase request indicating a product to be purchased;
        in response to receiving the product-purchase request:
            utilize first online merchant interface data to interact with the first online merchant system to obtain first purchase data, wherein:
                the first online merchant interface data includes data corresponding to multiple interfaces for interacting with the first online merchant system, the multiple interfaces including one or more of an API, standard Web site, mobile Web site, mobile app, and non-public URL for interacting with the first online merchant system, the proxy-purchase computer interfacing with the first online merchant system based on selection from the multiple interfaces, the selection from the multiple interfaces based upon efficiency or reliability of interfacing with the first online merchant system;
                the first purchase data includes one or more of first online merchant data, product information, fulfillment data and price data for the first online merchant system; and
            utilize second online merchant interface data to interact with the second online merchant system to obtain second purchase data, the second online merchant interface data including information for interacting with the second online-merchant system, the second purchase data including one or more of second online merchant data, product information, fulfillment data and price data for the second online merchant system;
        transmit the first and second purchase data to the client device;
        receive purchase-selection data from the client device in response to the transmitted first and second purchase data, the purchase-selection data including selection of one of the first and second online merchant systems for purchase of the product; and
        in response to receiving the purchase-selection data, utilize the merchant interface data corresponding to the selected online merchant system to provide the selected online-merchant system user-wallet data, or to utilize previously submitted user-wallet data, to effect purchase of the product from the selected online-merchant system on behalf of a user of the client device via at least one of an application programming interface and automated data entry based on the merchant interface data for the selected online merchant system.

2. The purchase-proxy computer of claim 1, wherein the memory stores further executable instructions that, in response to execution by the processor, cause the purchase-proxy computer to:
    select one of a plurality of different types of interfaces for communication of the user-wallet data to the selected online merchant system, the different types of interfaces including a user interface, a mobile user interface or an application programming interface, the selection of the one of the plurality of interfaces based upon efficiency or reliability of interfacing with the selected online merchant system; and cause communication of the user-wallet data to the selected online merchant system via the selected type of interface.

3. The purchase-proxy computer of claim 1, wherein the user-wallet data includes one or more of credential information, contact information, demographic data, reward card data, financial account data, or a user preference.

4. The purchase-proxy computer of claim 1, wherein the memory stores further executable instructions that, in response to execution by the processor, cause the purchase-proxy computer to receive at least a portion of the user-wallet data from the client device in connection with receiving the product-purchase request.

5. The purchase-proxy computer of claim 1, wherein the memory stores further executable instructions that, in response to execution by the processor, cause the purchase-proxy computer to receive incentive data relevant to the product from one or more incentive systems, the instruction communicated to the selected online merchant being to conduct the purchase of the product according to the incentive data.

6. The purchase-proxy computer of claim 1, wherein obtaining the first merchant purchase data comprises:
    utilizing the first online merchant interface data to interact with the first online merchant system to provide the user-wallet data and an indicator of the product to be purchased to the first online merchant system; and
    in response to providing the user-wallet data and the indicator, receiving the first merchant purchase data.

7. The purchase-proxy computer of claim 1, wherein:
    in response to receiving the product-purchase request, the processor is further caused to interface with the first online merchant system via multiple interfaces simultaneously.

8. The purchase-proxy computer of claim 1, wherein the second online merchant interface data includes data corresponding to an interface for interacting with the second online merchant system, the interface for the second online merchant system being different than an interface used for the first online merchant system.

9. A method to conduct a purchase with an online merchant system using a purchase-proxy computer, the method comprising:
    receiving a product-purchase request at the purchase-proxy computer from a client device, the product-purchase request indicating a product to be purchased,
    in response to receiving the product-purchase request, receiving, at the purchase-proxy computer, purchase data for the product from at least two online merchant systems, the purchase data including merchant data, price data, and fulfillment data for each of the at least two online merchant systems;
    causing communication of the purchase data from the purchase-proxy computer to the client device;
    receiving purchase-selection data at the purchase-proxy computer from the client device in response to the purchase data, the purchase-selection data including selection of a selected one of the at least two online merchant systems;
    in response to receiving the purchase-selection data, interacting with the selected online merchant system to provide user-wallet data to the selected online merchant system, or to utilize previously submitted user-wallet data, to effect purchase of the product from the selected online-merchant system on behalf of a user of the client device via at least one of an application programming interface and automated data entry;
    selecting one of a plurality of different types of interfaces for communication of the user-wallet data to the selected online merchant system, the different types of interfaces including a user interface, a mobile user interface or an application programming interface, the selection of the one of the plurality of interfaces based upon efficiency or reliability of interfacing with the selected online merchant system; and
    causing communication the user-wallet data to the respective selected online merchant system via the selected type of interface.

10. The method of claim 9, wherein the user-wallet data includes one or more of credential information, contact information, demographic data, reward card data, financial account data, or a user preference.

11. The method of claim 9, further comprising receiving at least a portion of the user-wallet data from the client device in connection with receiving a product-purchase request.

12. The method of claim 9, further comprising receiving incentive data relevant to the product from one or more incentive systems, the instruction communicated to the selected online merchant being to conduct the purchase of the product according to the incentive data.

13. The method of claim 9, wherein receiving, at the purchase-proxy computer, the purchase data, comprises:
    interacting with the first online merchant system to provide the user-wallet data and an indicator of the product to be purchased to the first online merchant system; and
    in response to providing the user-wallet data and the indicator, receiving at least a portion of the purchase data from the first online merchant system.

14. A non-transitory computer-readable storage medium having computer-readable program code portions stored therein that, in response to execution by a processor, cause a purchase-proxy computer to at least:
    receive a product-purchase request from a client device, the product-purchase request indicating a product to be purchased;
    in response to receiving the product-purchase request:
        utilize first online merchant interface data to interact with a first online merchant system associated with a first online merchant to obtain first merchant purchase data, the first online merchant interface data including information for interacting with the first online merchant system, the first merchant purchase data including one or more of first online merchant data, product information, fulfillment data and price data for the first online merchant system; and
        utilize second online merchant interface data to interact with a second online merchant system associated with a second merchant to obtain second purchase data for the product from the second online merchant system, the second online merchant interface data including information for interacting with the second online-merchant system, the second purchase data including one or more of second online merchant data, product information, fulfillment data and price data for the second online merchant system;
    transmit the first and second purchase data to the client device;
    receive purchase-selection data from the client device in response to the transmitted first and second purchase data, the purchase-selection data including selection of one of the first and second online merchant systems; and in response to receiving the purchase-selection data, utilize the merchant interface data corresponding to the selected online merchant system to provide the selected online merchant system user-wallet data, or to utilize previously submitted user-wallet data, to effect purchase of the product from the selected online-merchant system on behalf of a user of the client device via at least one of an application programming interface and automated data entry based on the merchant interface data for the selected online merchant system.

15. The computer-readable storage medium of claim 14 having further computer-readable program code portions stored therein that, in response to execution by the processor, cause the purchase-proxy computer to:

select one of a plurality of different types of interfaces for communication of the user-wallet data to the selected online merchant system, the different types of interfaces including a user interface, a mobile user interface or an application programming interface; and cause communication of the user-wallet data to the selected online merchant system via the selected type of interface.

16. The computer-readable storage medium of claim 14, wherein the user-wallet data includes one or more of credential information, contact information, demographic data, reward card data, financial account data, or a user preference.

17. The computer-readable storage medium of claim 14 having further computer-readable program code portions stored therein that, in response to execution by the processor, causes the purchase-proxy computer to receive at least a portion of the user-wallet data from the client device.

18. The computer-readable storage medium of claim 14 having further computer-readable program code portions stored therein that, in response to execution by the processor, causes the purchase-proxy computer to receive incentive data relevant to the product from one or more incentive systems, the instruction communicated to the selected online merchant being to conduct the purchase of the product according to the incentive data.

19. The computer-readable storage medium of claim 14, wherein obtaining the first merchant purchase data comprises:

utilizing the first online merchant interface data to interact with the first online merchant system to provide the user-wallet data and an indicator of the product to be purchased to the first online merchant system; and in response to providing the user-wallet data and the indicator, receiving the first merchant purchase data.

20. A purchase-proxy computer comprising:
a processor; and
a memory storing:
a first portion of user-wallet data associated with a user-wallet identifier; and
executable instructions that, in response to execution by the processor, cause the purchase-proxy computer to at least:
receive a product-purchase request from a client device, the product-purchase request indicating a product to be purchased, and including the user-wallet identifier;
receive a second portion of the user-wallet data from the client device;

assemble the user-wallet data using the first and second portions of the user-wallet data;
receive, at the purchase-proxy computer, purchase data from at least first and second online merchant systems respectively associated with first and second merchants, the purchase data including merchant data, price data, and fulfillment data for each of the first and second online merchant systems;
cause communication of the purchase data to the client device;
receive purchase-selection data from the client device in response to the purchase data, the purchase-selection data including selection of the first online merchant and a corresponding fulfillment option for a purchase of the product;
in response to receiving the purchase-selection data, automatically provide the first online merchant system the user-wallet data to effect purchase of the product from the first online-merchant system on behalf of a user of the client device in accordance with the fulfillment option via one or more interfaces selected from a plurality of potential interfaces based on efficiency or reliability.

21. The purchase-proxy computer of claim 20, further comprising:

the purchase proxy computer interacting with the first online merchant system to obtain a portion of the purchase data from the first online merchant system; and the purchase proxy computer storing the portion of the purchase data in a memory of the purchase proxy computer.

22. A method to conduct a purchase with an online merchant using a purchase-proxy computer, the method comprising:

(a) providing a purchase proxy computer comprising:
(i) stored first and second merchant conduits configured to respectively communicate with first and second online merchant systems, at least the first merchant conduit including data corresponding to multiple interfaces for interacting with the first online merchant system, the multiple interfaces including one or more of an API, standard Web site, mobile Web site, mobile app, and non-public URL selected based on efficiency and reliability of communicating with the first online merchant system;
(ii) stored user wallet information; and
(iii) purchase data for a product for each of the first and second online merchant systems;

(b) receiving a product-purchase request at the purchase-proxy computer from a client device, the product-purchase request indicating the product, and transmitting the purchase data to the client device in response thereto;

(d) receiving purchase-selection data at the purchase-proxy computer from the client device in response to the transmitting, said purchase-selection data indicating selection of the first merchant;

(e) assembling user wallet information; and (f) causing communication to conduct purchase of the product to the first online merchant via the first merchant conduit and selection from the multiple interfaces, whereby user-wallet information is provided to the online-merchant system based on selection from the multiple interfaces of the first merchant conduit, via at least one of an application programming interface and automated data entry.

23. The method according to claim 22 wherein said providing further comprises monitoring interface changes to the first and second online merchant systems and correspondingly updating the first and second merchant conduits in the purchase proxy computer.

24. The method of claim 22, further comprising:
- the purchase proxy computer interacting with the first online merchant system to obtain a portion of the purchase data from the first online merchant system; and
- the purchase proxy computer storing the portion of the purchase data in a memory of the purchase proxy computer.

* * * * *